(12) United States Patent
Sasvari

(10) Patent No.: US 7,073,046 B2
(45) Date of Patent: Jul. 4, 2006

(54) SYSTEM AND METHOD FOR MANAGEMENT OF MEMORY ACCESS IN A COMMUNICATION NETWORK BY USE OF A HYPERBOLIC MAPPING FUNCTION

(75) Inventor: Gyorgy Sasvari, Cranberry, PA (US)

(73) Assignee: Marconi UK Intellectual Property Ltd., Coventry (GB)

( * ) Notice: Subject to any disclaimer, the term of this patent is extended or adjusted under 35 U.S.C. 154(b) by 371 days.

(21) Appl. No.: 10/149,329

(22) PCT Filed: Dec. 7, 2000

(86) PCT No.: PCT/GB00/04692

§ 371 (c)(1),
(2), (4) Date: Oct. 15, 2002

(87) PCT Pub. No.: WO01/43396

PCT Pub. Date: Jun. 14, 2001

(65) Prior Publication Data

US 2003/0115435 A1    Jun. 19, 2003

(30) Foreign Application Priority Data

Dec. 7, 1999 (GB) .................................. 9928774.0

(51) Int. Cl.
*G06F 12/02* (2006.01)
(52) U.S. Cl. .................................... 711/217; 711/202
(58) Field of Classification Search ................ 711/200, 711/202, 216, 221; 370/395.32
See application file for complete search history.

(56) References Cited

U.S. PATENT DOCUMENTS

| 4,145,738 | A | | 3/1979 | Inoue et al. |
| 4,933,937 | A | | 6/1990 | Konishi |
| 5,025,364 | A | | 6/1991 | Zellmer |
| 5,627,986 | A | | 5/1997 | Frankland |
| 5,757,924 | A | | 5/1998 | Friedman et al. |
| 5,796,605 | A | | 8/1998 | Hagersten |
| 5,796,989 | A | * | 8/1998 | Morley et al. ................. 703/26 |
| 5,822,095 | A | | 10/1998 | Taga et al. |

FOREIGN PATENT DOCUMENTS

| EP | 0572696 A1 | | 12/1993 |
| GB | 0594196 A1 | * | 4/1994 |
| JP | 9-33750 | | 2/1997 |
| JP | 9-83495 | | 3/1997 |
| WO | WO 99/55056 | | 10/1999 |

OTHER PUBLICATIONS

Chandranmenon, Girish P. et al., "Reconsidering Fragmentation and Reassembly," ACM, ISBN: 0-89791-877-7, 1998.*

(Continued)

*Primary Examiner*—Hong Kim
*Assistant Examiner*—Shane M. Thomas
(74) *Attorney, Agent, or Firm*—Kirschstein, et al.

(57) ABSTRACT

A method of and system for memory access have address transformation circuitry for generating a single value of memory address from one or more corresponding values of an input quantity in which the number of values of the input quantity that correspond to a single value of the memory address varies across the range of values of the input quantity. The relationship between an input quantity and the corresponding memory address is a hyperbolic function.

21 Claims, 6 Drawing Sheets

OTHER PUBLICATIONS

Srinivasan V. et al., "Fast and Scalable Layer Four Switching," ACM, ISSN:0146-4833, 1998.*

*Firewalling the Net*, S. D. Hubbard, et al., BT Technol J, vol. 15, No. 2, Apr. 1997, pp. 94-106.

* cited by examiner

SYSTEM AND METHOD FOR MANAGEMENT OF MEMORY ACCESS IN A COMMUNICATION NETWORK BY USE OF A HYPERBOLIC MAPPING FUNCTION

BACKGROUND OF THE INVENTION

The present invention relates to the field of memories in general and the management of memory access in particular.

The open systems interconnection (OSI) reference model adopted by the International Standards Organisation (ISO) provides a structured architectural model for inter-computer communications.

Packet networks such as internet protocol (IP) are typically organised into a layered structure following the OSI 7 layer reference model. According to this model layer 1 comprises the physical medium, layer 2 is the link layer (point-to-point framing, e.g. IEEE 802 or media access control (MAC)), layer 3 is the network layer (e.g. IP), layer 4 is the transport layer (e.g. UDP, TCP, ICMP, etc.) and layer 5 is the session layer (e.g. RTP).

The above abbreviations are explained in the IETF RFC publications referred to below.

The upper layer, layer 5 adds a header to the payload or data being transmitted across the network. Each successively lower layer treats the payload and header of the immediately higher layer as its own payload and adds its own header to this payload. The combination of the original (data) payload with the headers will be referred to here as a "packet".

The internet protocol (IP) is a network layer protocol, i.e. corresponding to layer 3 of the OSI reference model. The IP layer is concerned with addressing information and control information that is included in the header of a packet to enable that packet to be successfully routed.

The layer 3 header is often referred to as the "internet protocol" or IP header, whereas the layer 4 header is referred to as the "protocol" header. It is to be noted that these are distinct entities and for the avoidance of confusion the terms 'layer 3 header' and 'layer 4 header' will be used here.

A typical internet protocol communications network is divided into secure and insecure areas. A secure area is protected from unauthorized access by users within insecure areas by a so-called firewall. This is a node that acts at the boundary between a secure and an insecure area to filter traffic coming into the secure area from the insecure area and vice versa. A basic principle of filtering is to hide the actual IP addresses and ports of the secure network from the insecure network. The 'ports' are not physical ports but fields in a header of a packet that can be used as address extensions. Two such ports are defined both occurring in the layer 4 header: a source port and destination port. Either or both ports may be used in this way, and for simplicity the term "port" is used in the following to cover all possibilities. The initiator of the call is unaware of the real destination address and port related to the destination node. When a call to a node in the secure network is initiated from the insecure network, the caller uses a "dummy" destination address and port available on the firewall instead of the actual destination address and port related to the true destination node.

Although the port may typically be used to identify the type of session layer, the firewall treats the port as an extension of the destination address. On receipt of a valid call (i.e. a call that is not rejected by the firewall) from the insecure network, the firewall translates the received destination address and port used by the caller into the actual destination and address of the called node within the secure network. For traffic in the opposite direction, the translation is effected in reverse.

In the layer 3 header, the source of a packet is identified by the source address, destination address, protocol and fragment identification fields. The source address is the address of the originator of the packet; and is made up of a network number (which forms the more significant part) and a node number (which form the less significant part): the destination address is the address of the intended recipient of the packet, the fragment offset is the offset in numbers of 8 bit octets relative to the start of the original layer 3 payload data in the fragment; the fragment identification field holds a value created by the source to characterise a packet so as to aid in reassembling the fragments of that packet; the protocol field identifies the type of layer 4 header (e.g. UDP, TCP, ICMP, etc.) associated with that packet. In order to provide an acceptable level of security, the firewall also needs to be able to identify the application associated with a particular Packet. Hence, in addition to the above layer 3 fields, the firewall needs access to the port of the layer 4 header.

When fragments are reassembled at the destination of the call, they are reassembled per application as indicated by the port as well as per source as indicated by the layer 3 header fields.

A problem arises in trying to identify the source of an incoming call from the insecure network due to fragmentation of packets. A layer 3 packet may be up to 64 Kilobytes long, however this packet plus the layer 3 header form the payload for the MAC (layer 2) frames which can only handle 'fragments' of up to 1500 bytes in length. Hence a typical layer 3 Packet will be transported in a plurality of fragments or layer 2 frames. To make matters worse, the fragments related to a particular packet may arrive at the media firewall in a random order. In filtering the incoming traffic, the firewall needs to be able to identify the source of each fragment.

Each layer 2 frame starts with the layer 2 header followed by the layer 3 header from the layer 3 packet followed by a section of the layer 3 payload. The layer 4 header forms part of the layer 3 payload which is divided into sections, each section being carried in a different layer 2 frame. Although each layer 2 frame contains a copy of the layer 3 header, only the first frame in a packet should contain a copy of the layer 4 header. Hence the port field should only exist in one of the fragments of a packet.

If the port field does occur in practice in more than one fragment this is an indication of an attack on the secure network. There is therefore a need to store the contents of the port field contained in the first fragment for each source identified for the duration of a packet so that it may be used in combination with the layer 3 header fields listed above to check subsequent fragments relating to the same packet.

The port field should occur in the first fragment received for a particular packet and this fragment should not overlap subsequent fragments. If this is not the case, the attacking fragments will be discarded by the firewall. Detailed operations of a firewall filter are given in Internet Engineering Taskforce (IETF) requests for comment RFC 1858 "security considerations for IP fragment filtering" October 1995.

Although described here in detail with reference to network layer header Version 4 (IPv4), the present invention is also applicable to network layer version 6 (IPv6) header format: the main difference between these two forms of header with respect to the present invention being that the Version 4 fragment offset and fragment identification fields are not present in the Version 6 header. The Version 6 header has a "next header" field which may point to a succession of further headers eventually leading to a header which comprises fragment offset and fragment identification fields. The firewall filter process would recognise that it was dealing with a Version 6 header and would access the fragment offset and identification fields in the relevant further header.

Details of the operation of the internet protocol in general and of the Version 4 and Version 6 headers in particular are contained in IETF requests for comment RFC 791 "DARPA Internet Programme Protocol Specification" September 1981 and RFC 2460 "Internet Protocol, version 6 (IPv6) specification" December 1998, respectively.

Not all types of layer 4 header contain the port field. Whereas transmission control protocol (TCP) and user datagram protocol (UDP) layer 4 headers do contain the port field, other forms of Layer 4 protocol (e.g. network management protocols) have no equivalent to the port field and therefore identification of the source has to be achieved in different ways. For these protocols the network management function will generate a substitute value to take the place of the "missing" port.

In acting to separate the secure network from the insecure network and ensure the security of the secure network, the firewall provides three types of transaction regulated by the filter, as follows:

"Local Call": voice/data call initiated by a source in the secure network and terminated at a destination in the same secure network;

"Outgoing Non-Local Call": voice/data call initiated by a source in the secure network and terminated at a destination in the insecure network;

"Incoming Non-Local Call": voice/data call initiated by a source in the insecure network and terminated at a destination inside the secure network.

It will be noted that two-thirds of all transactions types will have a node within the secure network identified in the source address. Each call/session transfers packets in both directions, so even if there were no local calls, half of the packets would have the secure network number in the IP Source Address Field.

The conventional approach to tracking the source for a succession of fragments associated with a particular packet is centred on processing in software. However, such implementations are slow due to processing bottlenecks.

SUMMARY OF THE INVENTION

The present invention provides a memory access system comprising a plurality of storage locations for the storage of data therein and addressing means for selecting a desired one of the locations on the basis of a memory address; in which the system also comprises address transformation means for generating a single value of the memory address from one or more corresponding values of an input quantity; in which the number of values of the input quantity that correspond to a single value of the memory address varies across the range of values of the input quantity.

The present invention also provides a source tracking memory for storing data for identifying fragments of a data structure received via a communication link comprising the system.

The present invention also provides an internet protocol based communication system comprising a source tracking memory.

The present invention also provides an asynchronous transfer mode based communication system comprising a source tracking memory.

The present invention also provides a method for memory access in a memory system in which one or more values of an input quantity correspond to a single value of a memory address in which the method comprises the steps of transforming the input quantity to generate a corresponding value of the memory address in which the number of values of the input quantity that are transformed to a single value of the memory address varies across the range of values of the input quantity.

BRIEF DESCRIPTION OF THE DRAWINGS

Embodiments of the invention will now be described by way of example with reference to the drawings in which.

DETAILED DESCRIPTION OF THE PREFERRED EMBODIMENTS

Figure 4:
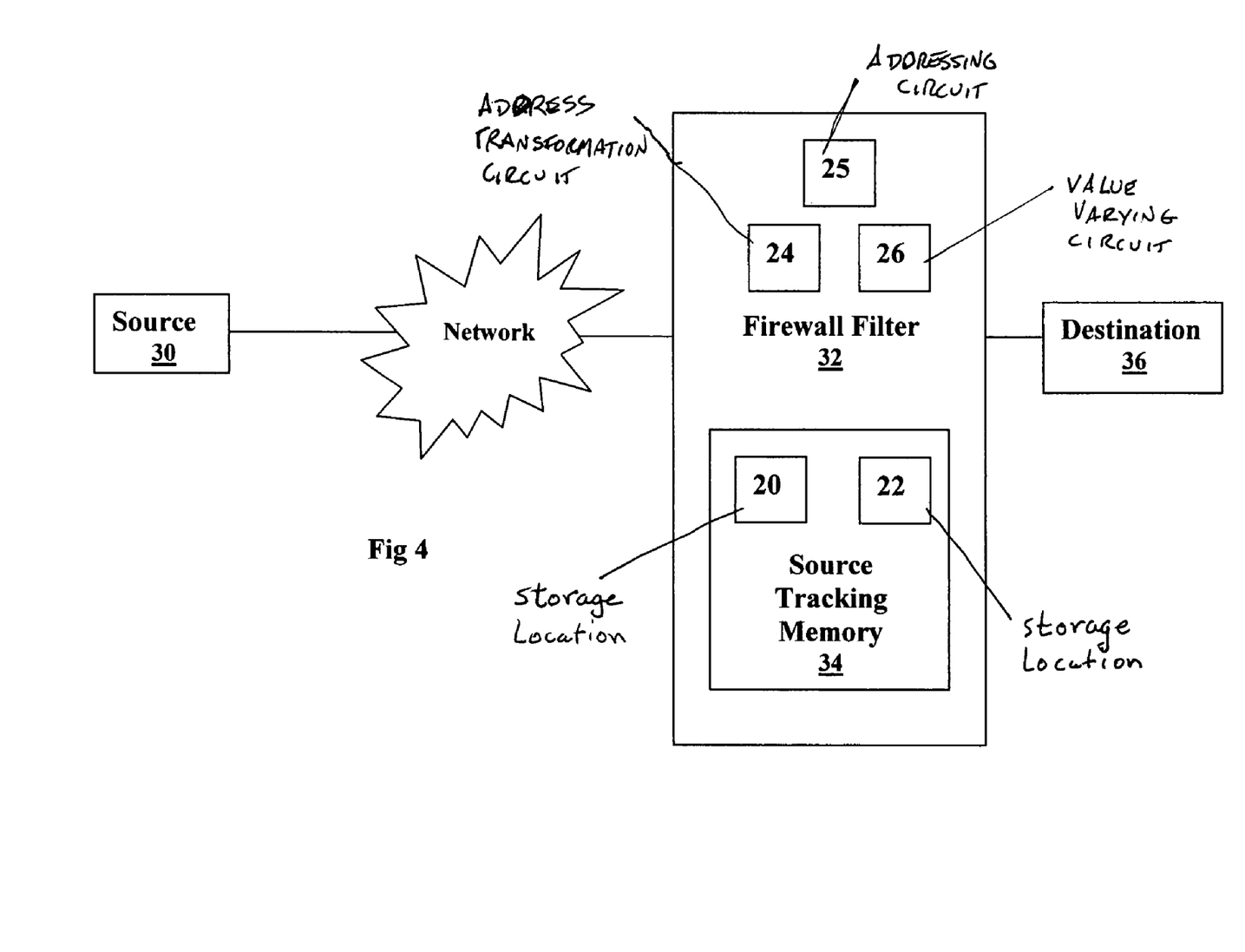
FIG. 4 is a block diagram of a system according to the present invention.

When a source 30 is identified by the firewall filter 32 it is necessary to store information to enable unambiguous identification of the source for use later in verifying the validity of subsequent fragments that appear to relate to the same IP packet.

A convenient way of storing and retrieving this information is to create an input address "x". An addressing circuit means 25 is operative for concatenating the contents of such input quantities as the source 30 address, destination 36 address, protocol and identification fields. In a preferred embodiment x will comprise a subset of the selected fields, i.e., comprising part or all of the source address, all or none of the destination address, protocol and fragmentation identity fields. In a preferred embodiment the contents of the identification field form the less significant end of the combined fields and the contents of the source address form the most significant end. The value of x will be unique for each source. At each storage location 20,22 in this source tracking memory 34, the filter 32 stores one or more source records each comprising, in addition to the contents of the port field of a packet, a so-called time stamp associated with that record and the value of the combined field corresponding to the value of x used to access that location. This is necessary in order to allow the filter 32 to verify on subsequent accesses to that location that the value 'x' used to subsequently access it is the same as that used to originally write to it.

The source tracking memory is operated as follows. When a source sends a first fragment (i.e. with fragment offset (FO) set to zero and more fragments (MF) flag set to 1) to the firewall a source record is entered in the source tracking memory to identify that packet, as detailed above. The time stamp associated with that source record informs the filter that the memory location is 'occupied' until expiry of a set time period. For any subsequent fragments relating to the same packet i.e. with matching contents in the combined field the filter uses the contents of the memory location to run checks on the fragment. These checks include identifying subsequent fragments having a low value of FO and MF Flag set to 1: these will be discarded by the firewall. Some fragments relating to a packet may "overtake" the first fragment in passing through the network to arrive at the firewall before the true "first" fragment. These fragments will not have a corresponding entry in the source tracking memory and will be discarded.

The operation of the firewall filter may be simplified by monitoring the protocol field. In practice only packets transmitting TCP protocol should ever be fragmented. Real-time traffic carried by the UDP protocol should never exceed the 1500 byte limit on MAC frames and hence should not be fragmented. Similarly, signaling or messaging packets (e.g., internet control message protocol (ICMP)) should be small enough to obviate fragmentation. In the IP Version 4 header the protocol field identifies the type of protocol encapsulated in its payload. In IP Version 6 headers the protocol field is replaced with the next header field which is used to identify a string of additional headers, this string of headers eventually identifying a header that contains the identity of the protocol used i.e., the layer 4 protocol header.

Hence, as described above we can use the value of the input address x to create an address into the source tracking memory of the firewall. Typically, the filtering rules block a large number of destination addresses and can in fact block all destination addresses except one. In addition, the filtering rules will typically act to block all protocols except three (i.e. TCP,UDP and ICMP). Normally no fragmentation is necessary under UDP or ICMP so that the filter can consider any such fragmentation as an attack and discard any fragments received under these protocols without tracking them. With such blocking in force, the above definition of x will be unique for each source which meets the requirements of the filtering rules even if the range of blocked destination addresses and blocked protocols are left out of x.

By way of example, if the number of protocols is limited to only one, the number of destination addresses is limited to 64 we can then reduce the length of x by limiting the contents of the destination address to 6 bits and omitting the protocol fields from x. (e.g. each source record will comprise 54 bit x+16 bit port+32 bit timestamp).

According to a preferred embodiment more than 1 different source record may be stored at any one location in the source tracking memory. Advantageously, the full depth of any one location can be read in one burst meaning that no additional clocks are needed to rerun the address generation algorithm, so it is more efficient. Here 'burst' is used to denote the reading of the whole contents of one location in one go.

According to a preferred embodiment, all the source records corresponding to all allowed destination addresses for any one combination of source address and fragmentation identity and protocol are stored in one memory location and there is no need to use the destination address in the generation of the input address x.

With the destination address and protocol fields excluded, x will become a 48 bit number in IP Version 4 and a 160 bit number in IP Version 6 (due to the differing lengths of the fields according to each version). A problem with using even these reduced values of x as memory addresses is that they relate to memory sizes (i.e., $2^{48}$ and $2^{160}$) that are far too large to be practicable. There is therefore a need for a mapping function or address transformation means 24 for efficiently mapping the excessively large address ranges generated from the combined fields into a manageable range corresponding to a memory address 'y'. By way of example we shall set 'y' to 20 bits i.e., corresponding to a range of $2^{20}$.

The mapping function proposed is a hyperbolic distortion of input address x around s. s is defined as the network number of the secure network padded with zeros at the less significant end to match the length of x (e.g., 48 bit in Version 4 and 160 bit in Version 6). Most values of x will be close to the value s as their source address will contain the network number of the secure network. Hence, a value varying circuit 26 determines the most frequently occurring values of x that will fall in a range close to s. The distortion is of the form shown in equations EQ.1 and EQ.2 below.

$$y_{x \geq s}(x) = \frac{A_1}{C_1 x - D_1} - B_1; \quad \text{(EQ. 1)}$$

$$y_{x < s}(x) = \frac{A_2}{-C_2 x - D_2} - B_2. \quad \text{(EQ. 2)}$$

All parameters ($A_1$, $B_1$, $A_2$, $B_2$, $C_1$, $C_2$, $D_1$, and $D_2$) may be positive or negative, integer or fraction). By selecting the parameter values, an arbitrary monotonic mapping profile can be generated with y decreasing at each side of the number line x=s. These mapping functions hold for x of any size.

For efficient use of memory space i.e. to reduce the probability of x values colliding in the y space, it is necessary to map x=s to one end of the range of y, i.e. to the minimum possible value (zero) or to the maximum possible y value ($y_{max}$), as illustrated in equations EQ.3 and EQ.4 for the case where x=s is mapped to y=$y_{max}$:

$$y_{max} = \frac{A_1}{C_1 s - D_1} - B_1; \quad \text{(EQ. 3)}$$

$$y_{max} = \frac{A_2}{-C_2 s - D_2} - B_2; \quad \text{(EQ. 4)}$$

and to map the two extreme values of x (i.e. the ends of the range of x values (0, $x_{max}$) to the other end of the range of y, i.e. to $y_{max}$ or to y=0, as illustrated in equations EQ.5 and EQ.6 for the case where the extreme values of x are mapped to y=0:

$$0 = \frac{A_1}{C_1 x_{max} - D_1} - B_1; \quad \text{(EQ. 5)}$$

$$0 = -\frac{A_2}{D_2} - B_2. \quad \text{(EQ. 6)}$$

For the case where x=s is mapped to y=0, the above equations (EQ.1 to EQ.6) are modified by multiplying both sides by −1 and adding $y_{max}$ to both sides.

Note that in the above methods, x=s divides the range of x (0,$x_{max}$) into two segments. Reusing this concept, the range can be segmented further and the above method applied to each pair of neighbouring segments separately: e.g. dividing the range 0,$x_{max}$ into two pairs of (i.e. 4) segments by lines x=$s_1$ and x=$s_2$ together with x=$x_0$ where $x_0$ is the border between the 2 pairs of segments e.g. $x_0$=($s_1$+$s_2$)/2, we can arrive at the set mapping functions $y_{x<s1}$, $y_{s1 \leq x \leq x0}$, $y_{x0<x<s2}$, and $y_{x \geq s2}$.

Figure 1:
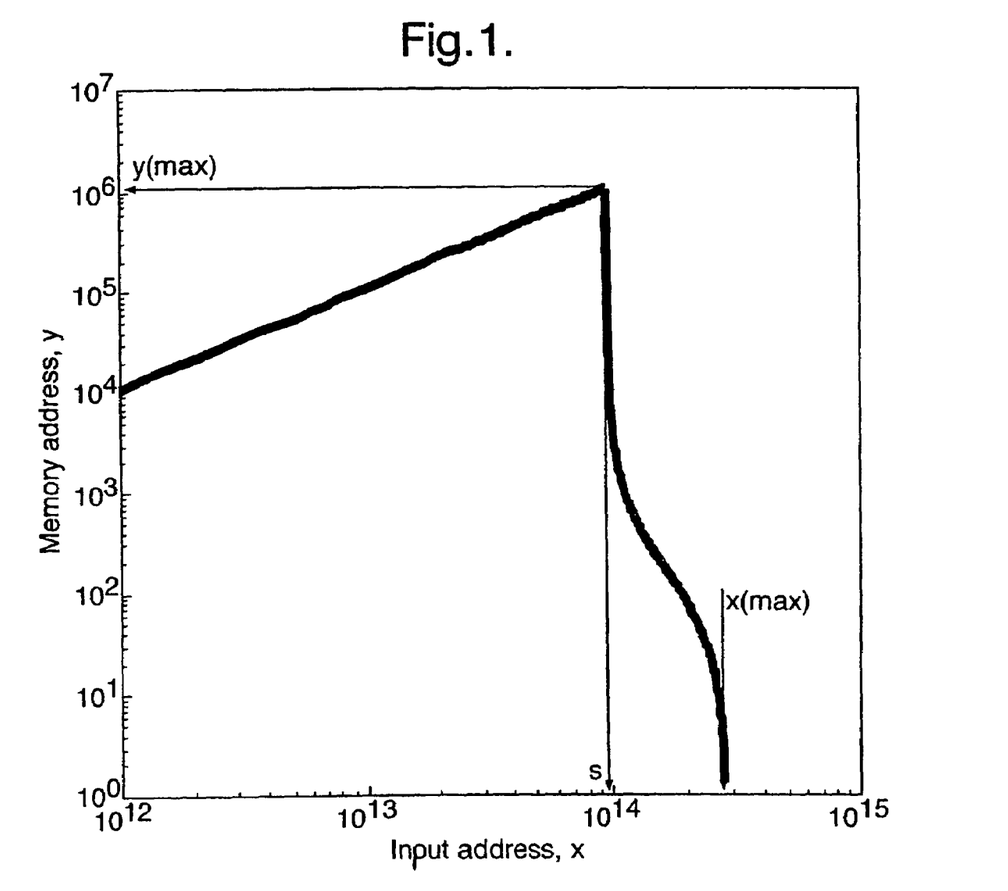
FIG. 1 is a graphical representation of address mapping according to the present invention.

Graphically, the mapping has the type of form shown in FIG. 1. Referring to FIG. 1, s was generated by way of example from an arbitrary network number, $y_{max}$ selected for 1M ($2^{20}$) locations in an SDRAM array, and $x_{max}$ was set to the number of all possible IP v4 x values ($2^{48}$). The parameters were: $A_1=2.8799\times10^{20}$, $B_1=95$, $C_1=16384$, $D_1=1.6038\times10^{18}$; $A_2=4.6236\times10^{35}$, $B_2=5.497520689\times10^{11}$, $C_2=16384$, $D_2=-8.4104\times10^{23}$.

Hence the mapping is broadest around s (i.e. the gradient of the characteristic of y=f(x) is greatest for the range of x close to s) and more compressed (i.e. the gradient reduces) as x moves away from s. A mapping of this form advantageously minimises the chance of contention for memory locations.

Figure 2:
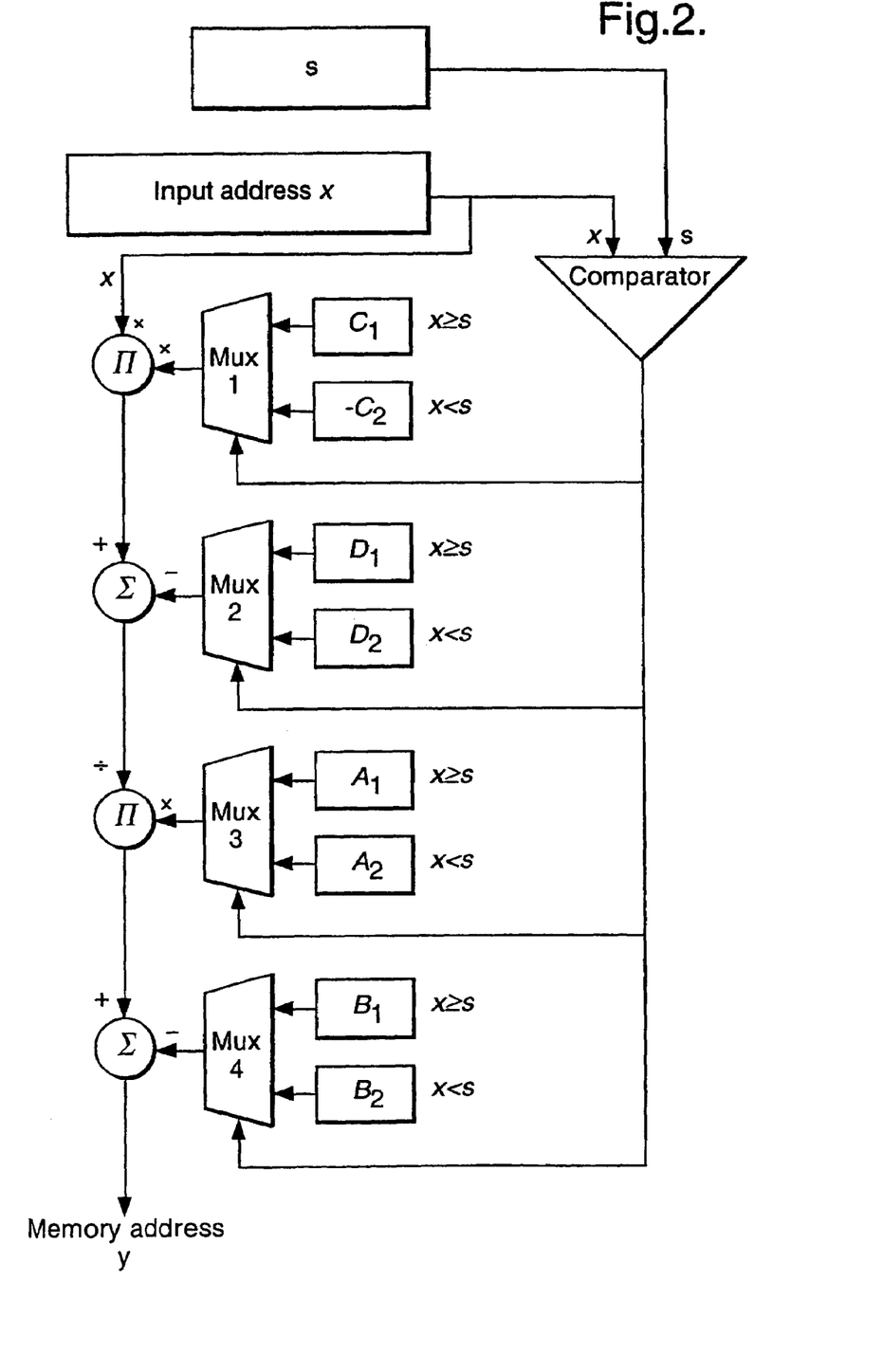
FIG. 2 is a schematic representation of a hardware implementation of the mapping function according to the present invention.

A hardware implementation for the mapping according to a further preferred embodiment of the present invention is shown in FIG. 2. As shown in FIG. 2 the comparator compares the values of x and s and controls a bank of four multiplexers according to the result. Each of the four multiplexers has two inputs for selecting one of two constant values. Hence a first multiplexer (mux 1) selects between $C_1$ and $-C_2$, a second multiplexer (mux 2) selects between $D_1$ and $D_2$, a third multiplexer (mux 3) selects between $A_1$ and $A_2$ and the fourth multiplexer selects between $B_1$ and $B_2$. The constant value mentioned first in the above list for each multiplexer is selected if x is found to be greater than or equal to s with the second mentioned constant value being selected if x is found to be less than s. The first multiplexer feeds into a multiplier whose other input carries the value of x. The product of the constant selected by the first multiplexer and x is provided to the plus input of a summer whose minus input is supplied by the output of the second multiplexer. The output of the summer forms the divide input to a second multiplier whose multiply input is provided by the output from the third multiplexer. The output from the second multiplier forms the plus input to a second summer who negative input is provided by the fourth multiplexer. The output of the second summer provides the memory address y. Referring to FIG. 2, Σ indicates add/subtract logic, Π indicates multiply/divide logic. Multiplying x by $C_1$, $C_2$ may be reduced to padding m zeros to the less significant end of x if $C_1$, $C_2$ are powers of 2 ($2^m$). All negative numbers are 2's complements i.e. $-x=\text{invert}_{bitwise}(x)+1$. The circuits are preferably fixed point binary, but can be floating point if the higher cost and complexity is acceptable. According to a further preferred embodiment the hardware may be pipelined to increase throughput. The hardware would typically be implemented as a PLD or ASIC depending on requirements.

If input addresses $x_1, x_2, \ldots x_n$ collide in the memory address space y, links (denoted "=>") are set up. Hence if two memory address values $y, y_1$ clash, i.e.=$y_1$, $y_1$=>$y_2$, ... $y_{n-1}$=>$y_n$, where $y_n$ is the first free location found. That is when an entry $x_{j+1}$ is in contention with another entry $x_j$ (i.e. both values of x map on to a particular value of y, say $y_j$), then y will be incremented until a free location is found, say at $y_{j+1}$. The entry for $x_{j+1}$ will then be stored at location $y_{j+1}$ and the value $y_{j+1}$ recorded at memory location $y_j$ in order to allow the $x_{j+1}$ entry 'diverted' to $y_{j+1}$ to be retrieved by means of the original address $y_j$. In order to identify which entry resides at the contended address $y_j$, the source record corresponding to $x_j$ is recorded at memory location $y_j$ to be retrieved by means of address $y_j$. Every location of the source tracking memory in use (e.g. $y_k$) will hold a copy of the source record corresponding to $x_k$. If a source record that is part of a link chain is cleared, the link pointing to it is also cleared (e.g. $y_k$ cleared results in $y_{k-1}$=>$y_{k+1}$).

Advantageously, to reduce the number of links, a source tracking memory location can hold more than one entry, as described above.

Each entry and each link is provided with an individual (non-real time) time stamp from a free-running non-over-rolling counter. By non-over-rolling is meant that the counter comprises enough bits not to reach maximum count and 'roll-over' to zero during the lifetime of the product. By way of example, a 64 bit counter incrementing on a 30 ns (33 MHz) clock overrolls in $2^{64}\times30$ ns=18000 years. On receipt of the last fragment of an IP packet, the filter should clear the corresponding memory entry and reorganize the links as above, as required. If the last fragment does not arrive (i.e. is lost in the network), the entry will not clear in the normal way. This is where the time stamp can resolve the situation. If a new entry tries to access that same memory location, it will be allowed to overwrite the existing entry if the time stamp has expired. A time stamp is said to have expired when a set amount of time is passed since its creation. If a link points to a timed-out entry, that link is also described as timed-out. If a non-timed-out link exists from a memory location y, a subsequent write access will follow the existing link chain from location v to its end and then find a free location for the new entry.

Depending on the width of the memory data bus and the access burst length (i.e. the number of data words read in one burst where the word size is the width of the memory data bus) any one memory location y can have more than one entry. This reduces the number of links necessary. In the following, one entry per y location is assumed.

The compression of the address range resulting from the mapping (or transformation) of x to y will inevitably lead to contention for memory addresses. This contention has conventionally been handled in software typically by use of hashing techniques.

Figure 3A:
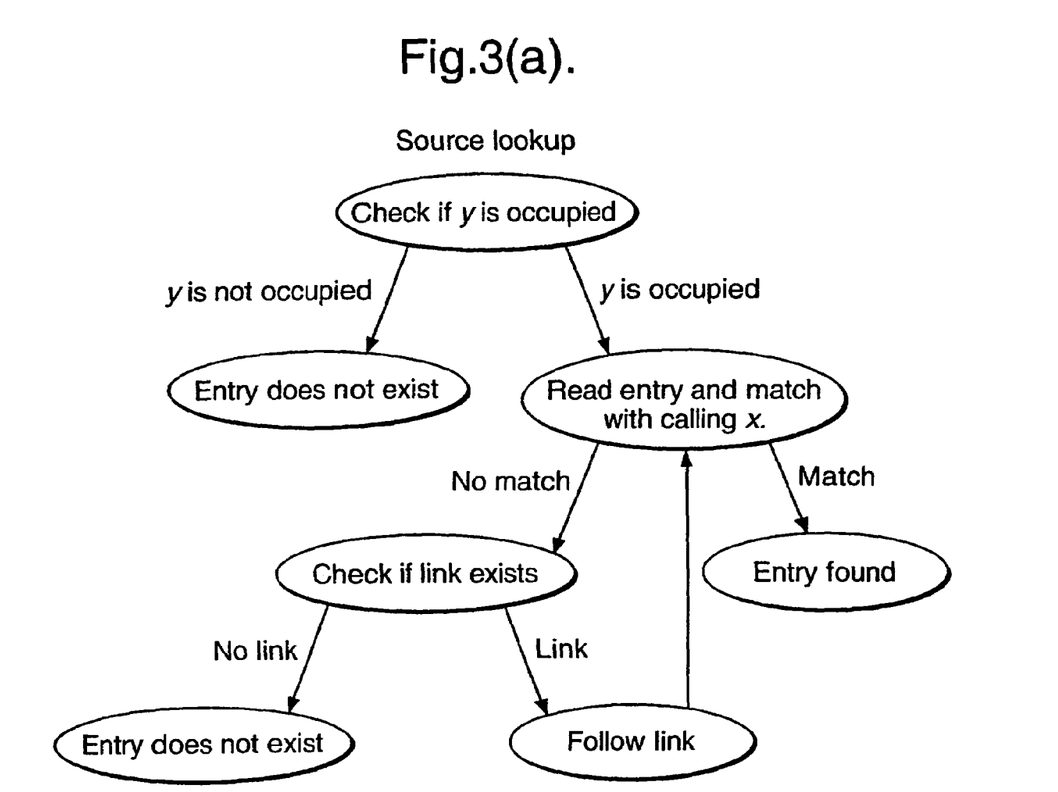
FIGS. 3(a), 3(b), and 3(c) comprise flow charts illustrating memory access based on a mapping function according to the present invention.

A state transition diagram representing a hardware state machine to lookup a source entry at the memory address y (i.e. the output of the mapping function described above) is shown in FIG. 3a. Referring to FIG. 3a, the hardware state machine checks if location y is occupied. If location y is not occupied an entry does not exist at that location. (Step 1) if that location is occupied, the hardware state machine reads the entry and compares it with the input (or calling) value of x. If the values of x and the source record match, the correct entry has been found. If there is no match, the hardware state machine checks if a link exists from that location. If no link exists an entry does not exist for that x. If a link does exist from that location, the hardware state machine follows the link to the indicated location and continues from step 1 above.

Figure 3B:
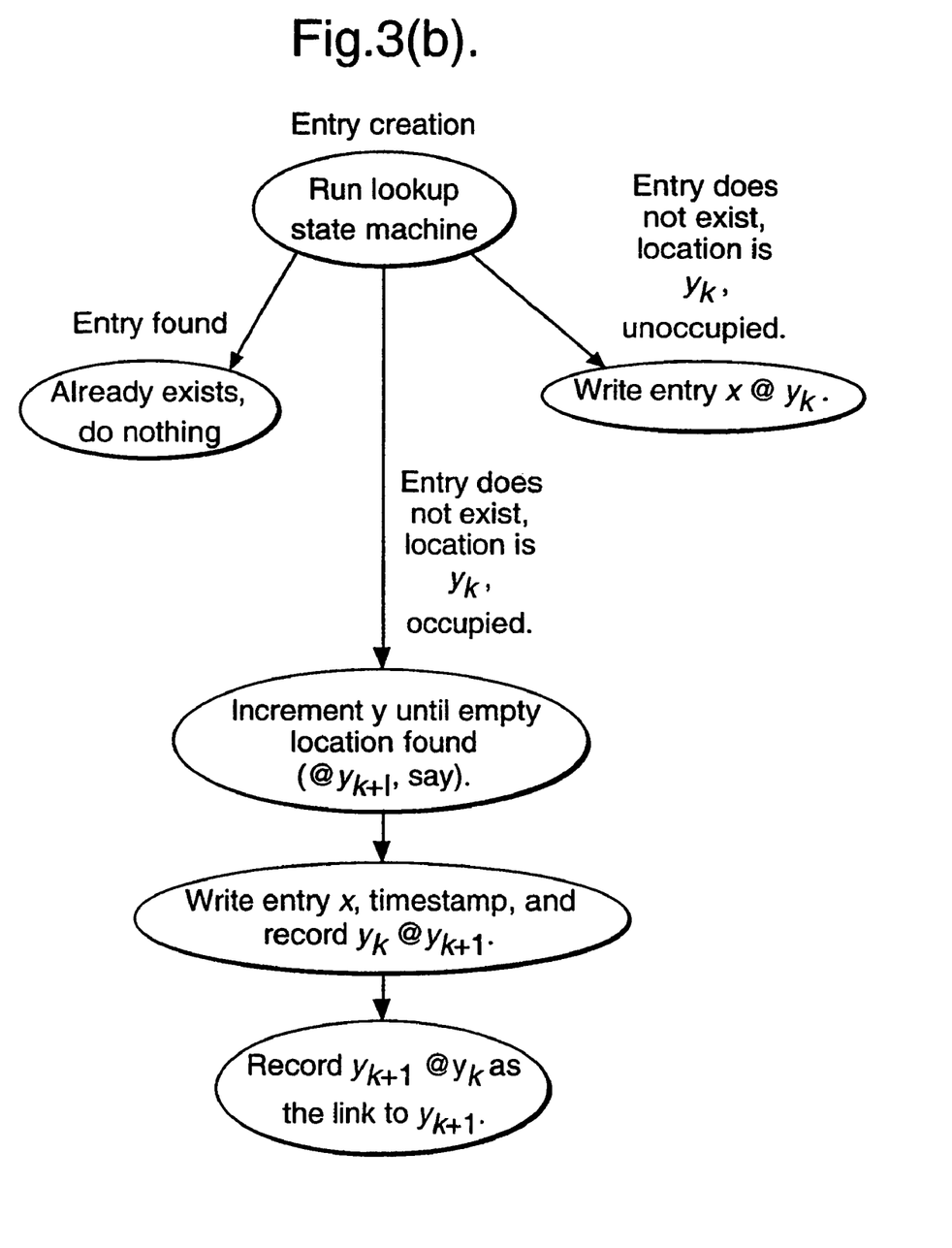

FIG. 3b shows how the hardware state machine creates a source entry. First the hardware state machine needs to find a empty location in the memory. A location is defined as empty if it either contains no entry or contains only an entry whose timestamp has expired. Referring to FIG. 3b, if an entry has not been found during the source look-up operation, i.e. the desired entry does not exist and location $y_k$ indicated by the transformation performed on input value $x_k$ is unoccupied, the hardware state machine will write the source location corresponding to $x_k$ to location $y_k$. If the desired entry does not exist but location $y_k$ is occupied, the hardware state machine will increment y until an empty location is found (e.g. at $y_{k+1}$). The hardware state machine will then write the source record corresponding to $x_k$, together with the time stamp into the location $y_{k+1}$, and will record $y_k$ at $y_{k+1}$ to create the link to $y_{k+1}$. If the hardware state machine has found an entry with an unexpired time stamp then the desired entry already exists and there is no need to create a new entry.

Figure 3C:
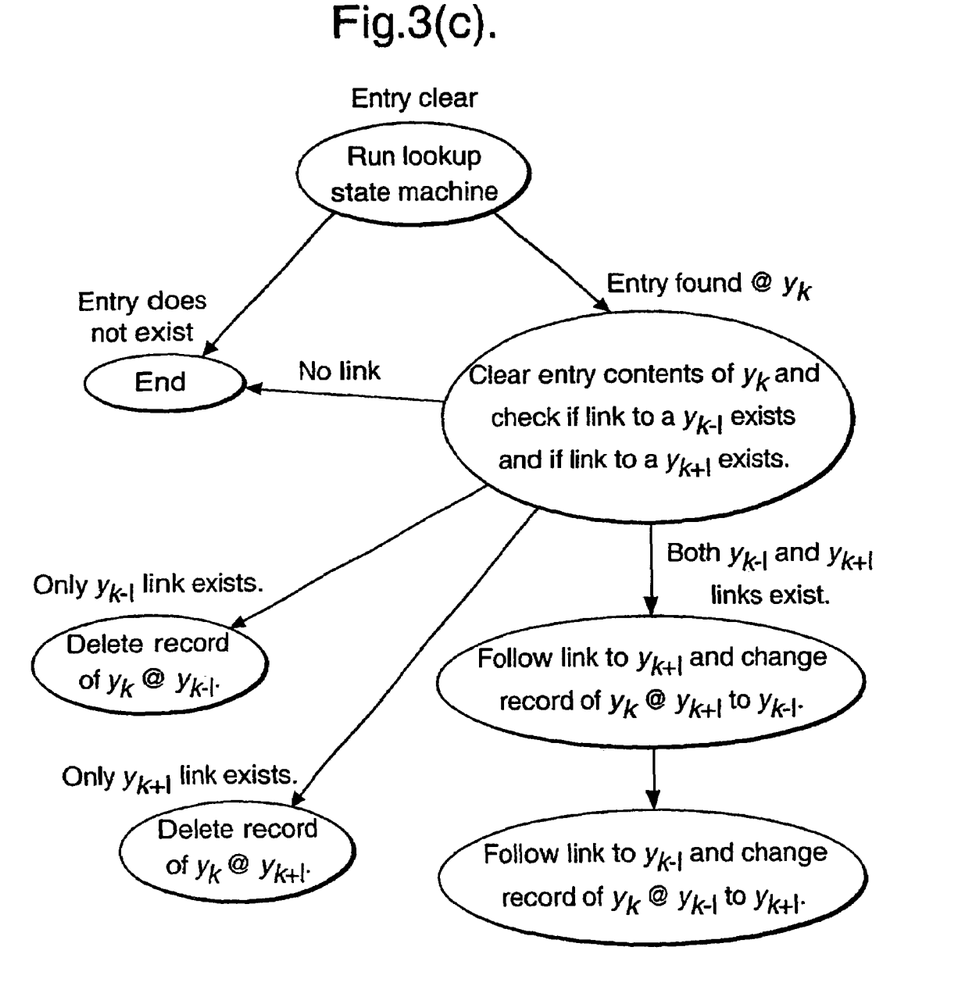

FIG. 3c shows how a hardware state machine clears a source entry. This state machine updates the link chain when an entry is cleared. As an alternative to the sequence of operations shown in FIG. 3c with the two blocks following the decision "both $y_{k+1}$ and $y_{k-1}$ links exist", these two operations may be carried out in the reverse order, i.e. the "following link to $y_{k-1}$" operation may occur before the "following link to $y_{k+1}$" operation.

Referring to FIG. 3c, the hardware state machine will 'look up' the desired entry, as described above. If the entry does not exist (i.e. is not found) the hardware state machine will do nothing. If the desired entry is found at location $y_k$, the hardware state machine will clear the entry at $y_k$ and check if a link to location with a lower address ($y_{k-1}$) exists and will check if a link to a location with a higher address ($y_{k-1}$) exists. If no links are found the "entry clear" operation is complete. If only a link to $y_{k-1}$ exists, the hardware state machine will delete the record of $y_k$ at $y_{k-1}$. If only a link to $y_{k+1}$ exists, the hardware state machine will delete the record of $y_k$ at $y_{k+1}$. If links to both locations $y_{k-1}$ and $y_{k+1}$ exist, the hardware state machine will follow the link to $y_{k+1}$ and change the record of $y_k$ at $y_{k+1}$ to $y_{k-1}$. Either before or after the previous step the hardware state machine will follow the link to $y_{k-1}$ and change the record of $y_k$ at $y_{k-1}$ to $y_{k+1}$.

The invention claimed is:

1. A memory access system, comprising:
   a) a plurality of storage locations for storing data therein;
   b) addressing means for selecting a desired one of the storage locations on the basis of a memory address; and
   c) address transformation means for generating a single value of the memory address from one or more corresponding values of an input quantity by mapping each value of the input quantity to the corresponding value of the memory address by a hyperbolic function, the number of values of the input quantity that correspond to a single value of the memory address varying across a range of values of the input quantity.

2. The memory access system as claimed in claim 1, in which various values of the input quantity are received over time, in which the address transformation means generates a plurality of memory addresses forming a range of memory addresses, and selects addresses at one end of the memory address range to correspond to a range comprising the most frequently occurring values of the input quantity.

3. The memory access system as claimed in claim 2, in which the address transformation means selects the other end of the memory address range to correspond to extreme values of the input quantity.

4. The memory access system as claimed in claim 2, in which the address transformation means divides the range of values of the input quantity by a value of the input quantity forming the one end of the range of most frequently occurring values.

5. The memory access system as claimed in claim 1, in which, for a first part of the range of values of the input quantity, the address transformation means maps each value of the input quantity to the corresponding value of the memory address by a first hyperbolic function; and, for a second part of the range of values of the input quantity, the address transformation means maps each value of the input quantity to the corresponding value of the memory address by a second hyperbolic function.

6. The memory access system as claimed in claim 1, in which the address transformation means maps some values of the memory address to a single value of the input quantity.

7. A source tracking memory for storing data for identifying fragments of a data structure received via a communication link, comprising a memory access system, said memory access system comprising:
   a) a plurality of storage locations for storing data therein;
   b) addressing means for selecting a desired one of the storage locations on the basis of a memory address; and
   c) address transformation means for generating a single value of the memory address from one or more corresponding values of an input quantity by mapping each value of the input quantity to the corresponding value of the memory address by a hyperbolic function, the number of values of the input quantity that correspond to a single value of the memory address varying across a range of values of the input quantity.

8. The source tracking memory as claimed in claim 7, in which the input quantity comprises a set of data for characterizing the fragments.

9. The source tracking memory as claimed in claim 8, in which the fragments comprise header information, and in which the set of data is derived from the fragment header information.

10. An internet protocol based communication system comprising a source tracking memory for storing data for identifying fragments of a data structure received via a communication link, comprising a memory access system, said memory access system comprising:
    a) a plurality of storage locations for storing the data therein;
    b) addressing means for selecting a desired one of the storage locations on the basis of a memory address; and
    c) address transformation means for generating a single value of the memory address from one or more corresponding values of an input quantity by mapping each value of the input quantity to the corresponding value of the memory address by a hyperbolic function, the number of values of the input quantity that correspond to a single value of the memory address varying across a range of values of the input quantity.

11. An asynchronous transfer mode based communication system comprising a source tracking memory for storing data for identifying fragments of a data structure received via a communication link, comprising a memory access system, said memory access system comprising:
    a) a plurality of storage locations for storing the data therein;
    b) addressing means for selecting a desired one of the storage locations on the basis of a memory address; and
    c) address transformation means for generating a single value of the memory address from one or more corresponding values of an input quantity by mapping each value of the input quantity to the corresponding value of the memory address by a hyperbolic function, the number of values of the input quantity that correspond to a single value of the memory address varying across a range of values of the input quantity.

12. A method of accessing memory in a memory system in which one or more values of an input quantity correspond to a single value of a memory address, the method comprising the steps of:
    a) transforming the input quantity to generate a corresponding value of the memory address by a hyperbolic function; and
    b) varying the number of values of the input quantity that are transformed to a single value of the memory address across a range of values of the input quantity.

13. The method as claimed in claim 12, including the step of receiving various values of the input quantity over time, and selecting one end of the memory address range to correspond to a range comprising the most frequently occurring values of the input quantity.

14. The method as claimed in claim 13, including the step of selecting a minimum value of the memory address to correspond to extreme values of the input quantity.

15. The method as claimed in claim 13, and the step of dividing the range of values of the input quantity by a value of the input quantity forming the one end of the range of most frequently occurring values.

16. The method as claimed in claim 12, including the steps of using a first hyperbolic function to transform each value of the input quantity to a corresponding value of the memory address for a first part of a range of values of the input quantity; and using a second hyperbolic function to transform each value of the input quantity to a corresponding value of the memory address for a second part of the range of values of the input quantity.

17. A method of identifying fragments of a data structure received via a communication link using a source tracking memory for storing data in which one or more values of an input quantity correspond to a single value of a memory address, the method comprising the steps of:
   a) transforming the input quantity to generate a corresponding value of the memory address by a hyperbolic function; and
   b) varying the number of values of the input quantity that are transformed to a single value of the memory address across a range of values of the input quantity.

18. The method as claimed in claim 17, in which the input quantity comprises a set of data for characterizing the fragments.

19. The method as claimed in claim 18, in which the fragments comprise header information, and in which the method includes the step of generating the set of data from the fragment header information.

20. A circuit for performing an address transformation, comprising:
   a) means for generating a single value of a memory address from one or more corresponding values of an input quantity by mapping each value of the input quantity to the corresponding value of the memory address by a hyperbolic function; and
   b) means for varying the number of values of the input quantity that correspond to a single value of the memory address across a range of values of the input quantity.

21. The circuit of claim 20, comprising a plurality of stages for pipelined operation.

* * * * *

UNITED STATES PATENT AND TRADEMARK OFFICE
CERTIFICATE OF CORRECTION

PATENT NO. : 7,073,046 B2
APPLICATION NO. : 10/149329
DATED : July 4, 2006
INVENTOR(S) : Sasvari It is certified that error appears in the above-identified patent and that said Letters Patent is hereby corrected as shown below:

On the Face Page, under "Notice", in Column 1, Line 3, delete "371" and insert -- 372 --, therefor.

In Column 4, Line 25, delete "invention." and insert -- invention; and --, therefor.

In Column 6, Line 2, delete "bits" and insert -- bits, --, therefor.

In Column 6, Line 66, after "set" insert -- of --.

In Column 6, Line 66, delete " $y_{x<s1}, y_{s1 \leq x \leq x0}, y_{x0<x<s2},$ " and insert -- $y_{x<s_1}, y_{s_1 \leq x \leq x_0}, y_{x_0<x<s_2},$ --, therefor.

In Column 6, Line 67, delete " $y_{x \geq s2}$, " and insert -- $y_{x \geq s_2}$, --, therefor.

In Column 8, Line 23, delete "v" and insert -- y --, therefor.

In Column 9, Line 19, delete "($y_{k-1}$)" and insert -- ($y_{k+1}$) --, therefor.

Signed and Sealed this

Thirteenth Day of January, 2009

JON W. DUDAS
*Director of the United States Patent and Trademark Office*